No. 636,969. Patented Nov. 14, 1899.
R. EWING.
MOTION REVERSING MECHANISM.
(Application filed May 3, 1899.)
(No Model.) 3 Sheets—Sheet 1.
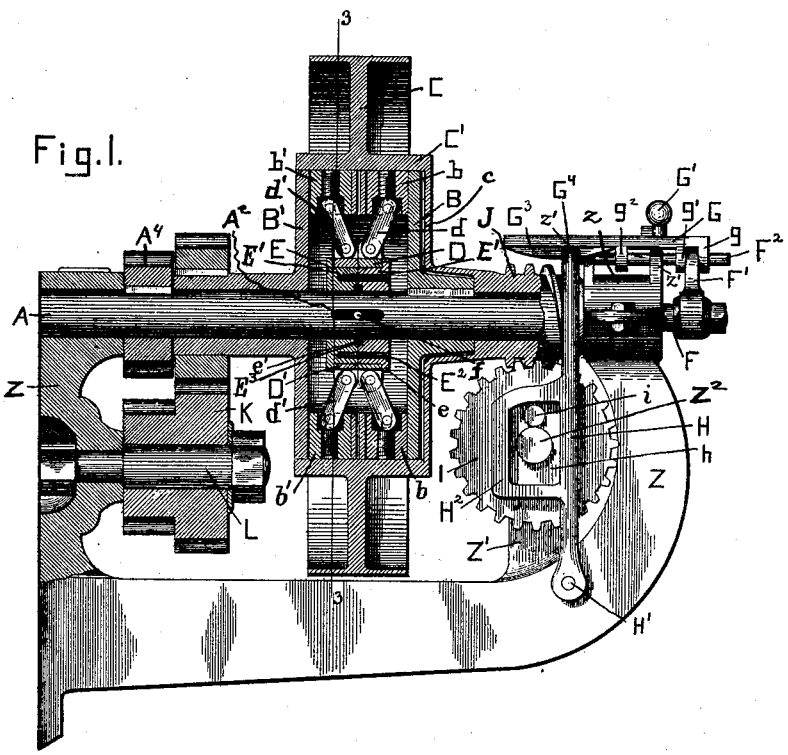
Fig. 1.
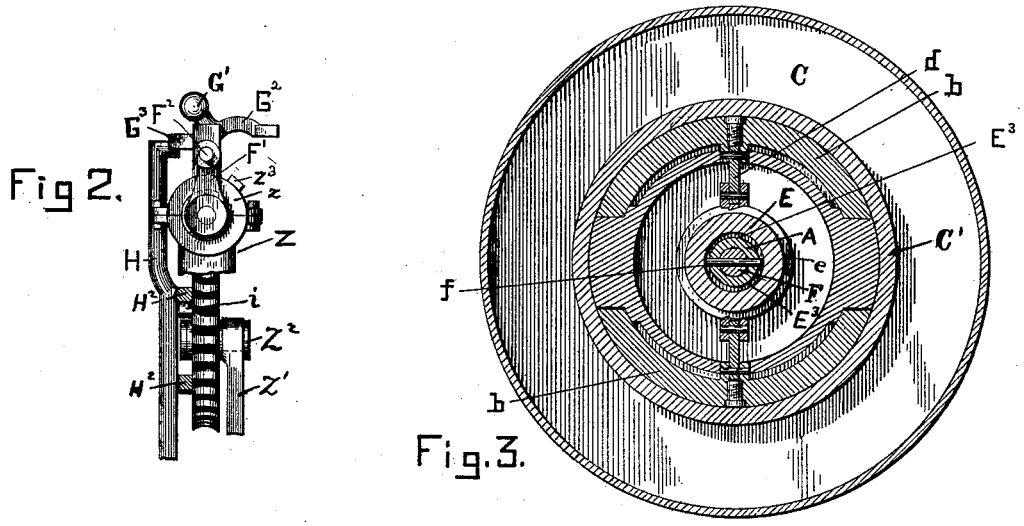
Fig. 2.
Fig. 3.
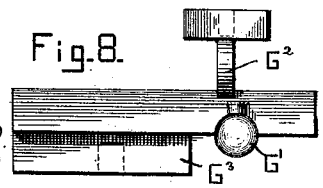
Fig. 8.
Witnesses
H. S. Austin.
James R. Mansfield
Inventor:
Robert Ewing
By:
Alexander & Dowell
Attorneys
THE NORRIS PETERS CO., PHOTO-LITHO., WASHINGTON, D. C.

No. 636,969. Patented Nov. 14, 1899.
R. EWING.
MOTION REVERSING MECHANISM.
(Application filed May 3, 1899.)
(No Model.) 3 Sheets—Sheet 2.

Witnesses
H. S. Austin.
James R. Mansfield

Inventor
Robert Ewing.
By Alexander & Dowell
Attorneys.

No. 636,969. Patented Nov. 14, 1899.
R. EWING.
MOTION REVERSING MECHANISM.
(Application filed May 3, 1899.)
(No Model.) 3 Sheets—Sheet 3.

Witnesses:
H. S. Austin,
James R. Mansfield.

Inventor:
Robert Ewing.
By his attorneys.
Alexander & Dowell

UNITED STATES PATENT OFFICE.

ROBERT EWING, OF TROY, NEW YORK.

MOTION-REVERSING MECHANISM.

SPECIFICATION forming part of Letters Patent No. 636,969, dated November 14, 1899.

Application filed May 3, 1899. Serial No. 715,489. (No model.)

*To all whom it may concern:*

Be it known that I, ROBERT EWING, of Troy, in the county of Rensselaer and State of New York, have invented certain new and useful Improvements in Motion-Reversing Mechanism; and I hereby declare that the following is a full, clear, and exact description thereof, reference being had to the accompanying drawings, which form part of this specification.
This invention is an improvement in mechanism for reversing motion or for imparting reverse rotary movements from a shaft or pulley rotating continuously in one direction; and it has especial reference to the production of self-controlled motion-reversing mechanism, as will be fully understood from the following description, taken in connection with the accompanying drawings, which explain the invention in detail, while the claims state concisely the essential features thereof.

Figure 4:
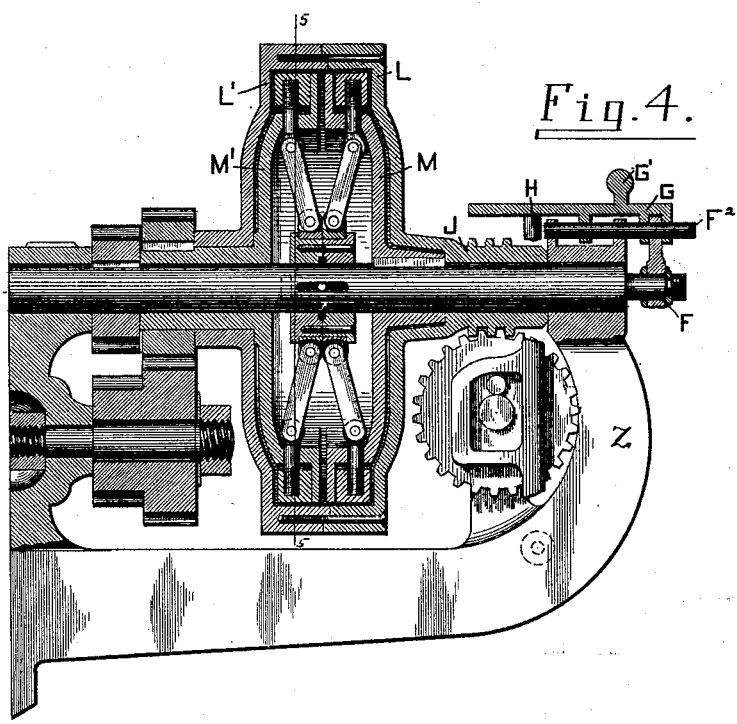
Figure 5:
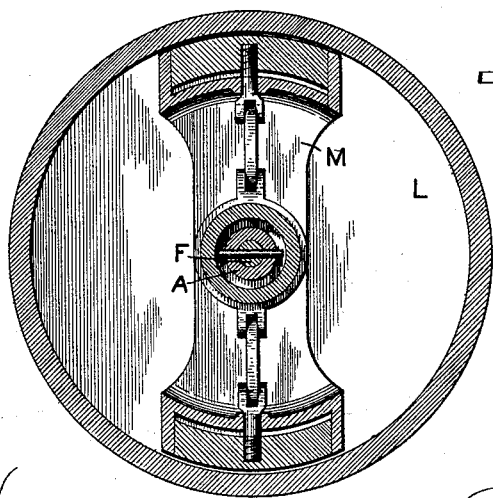
Figure 6:
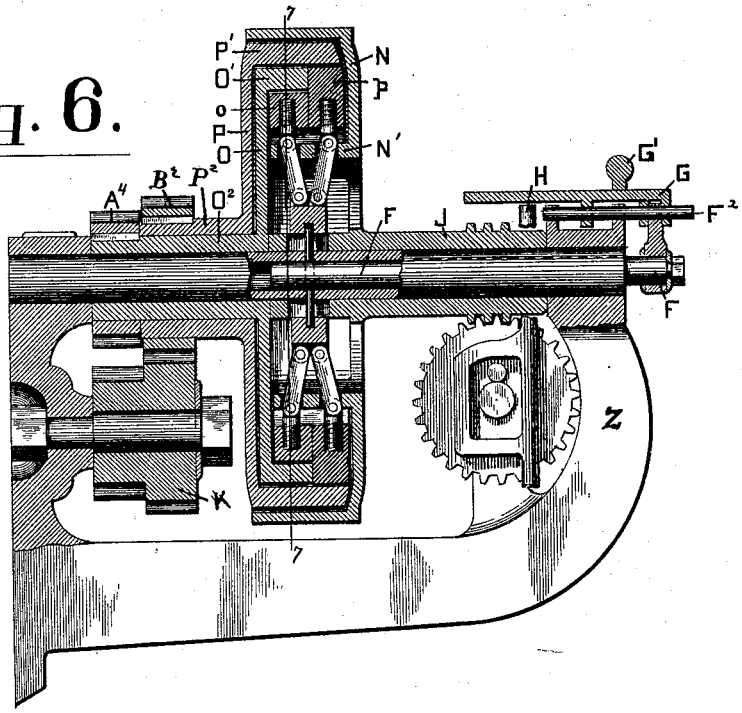
Figure 7:
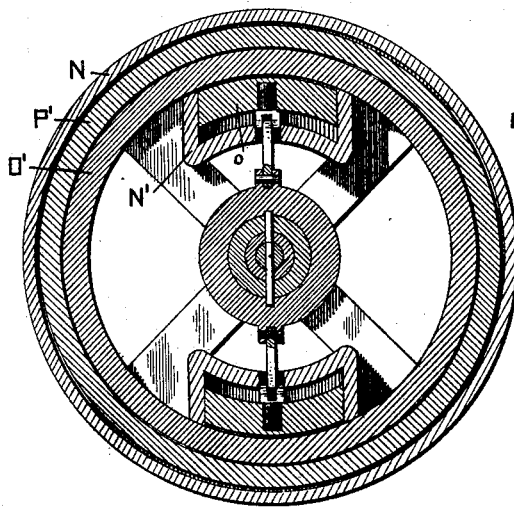

In the accompanying drawings, Figure 1 is a part sectional elevation of the preferred form of the motion-reversing mechanism. Fig. 2 is a partly-vertical section end view of Fig. 1. Fig. 3 is a detail section on line 3 3, Fig. 1. Fig. 4 is a view similar to Fig. 1, showing a modification. Fig. 5 is a section on line 5 5, Fig. 4. Fig. 6 is a sectional view similar to Fig. 1, showing another modification of the device. Fig. 7 is a sectional view on line 7 7, Fig. 6; and Fig. 8 is a top view of the plate G.

A designates a tubular shaft which is journaled in suitable bearings in a frame Z, which may be of any suitable construction, and as shown is a metal frame adapted to be formed on or secured to the machine to which the motion-reversing mechanism is to be applied. Upon this shaft, intermediate the bearings, are mounted two oppositely-facing disks B B', disk B being keyed to the shaft A, while disk B' is loose thereon. Surrounding and inclosing the peripheries of these disks is a pulley C, which, as shown, has a hub C' large enough to allow the disks B B' to be fitted into the ends thereof and center the pulley upon the shaft A. Attached to the inner face of disk B are the opposite clutch-blocks *b b*, (see Fig. 3,) which may be operated by means of links *d*, connected to an annulus D, rotatably guided in a flanged collar E within the hub C' and between the disks B B'. By sliding collar E on shaft A the clutch-blocks *b* are thrown into and out of engagement with the hub C', and thus may be caused to lock disk B to the pulley or release it therefrom, as desired. To the inner face of disk B' are attached similar clutch-blocks *b'*, which are connected by links *d'* to an annulus D', loosely mounted on collar E beside but independently of annulus D, and by properly shifting collar E the disk B' may be locked to the pulley C or released therefrom, as desired. It is obvious from the drawings that when disk B' is locked to the pulley disk B is disengaged therefrom, and vice versa. It is also possible by shifting the collar E to a central position to disengage both disks from the pulley.

As a matter of convenience the collar E may be made of opposite similar halves E' E', secured together by screws or bolts $E^2$, each provided with an external flange *e* on its outer edge and with an internal annular recess *e'* near its lower edge, which recesses *e'* together form an annular groove $E^3$ in the collar around the shaft A, and into this groove project the ends of a pin *f*, which transfixes shaft A and is fastened to a rod F within shaft A, the pin *f* being rigidly connected to rod F and rotating with shaft A and capable of movement longitudinally of said shaft, which is provided with slots $A^2$ to permit this.

The shaft F projects beyond one end of shaft A, as shown, and on its projecting end is journaled an arm F', which is so connected to the shaft, as indicated, that the latter can revolve freely in the arm, but has no longitudinal play therethrough. The end of this arm is connected to a longitudinally-movable hinged plate G, which plate is provided with depending eyes *g g' g²*, which are transfixed by a pin $F^2$, which latter also transfixes and is supported by ears *z'*, rising from the adjoining bearing *z*. As shown, the eye $g^2$ is intermediate the ears *z'*. The eyes *g g'* are on the projecting end of the plate and receive between them the upper end of arm F', which is also transfixed by pin $F^2$. In this manner longitudinal movement of plate G causes a similar movement of rod F through the arm F', and vice versa. This plate G is provided with a weighted finger G' by which it can be turned on its hinged rod H, and is also provided with a projecting notched finger $G^2$, the notch in which is adapted to engage a lug $z^3$ when the plate is shifted longitudinally, so as to cause rod F to move the collar $E^3$ into the intermediate position where neither disk B nor B' is locked to the pulley—i. e., in the position shown in Fig. 1—where the pulley C can run idly. The operator can by shifting plate G to the right or left lock either disk B or B' to the pulley; but the principal object of this invention is to automatically accomplish the alternate locking of the disks B B' to the pulley, and to effect this the plate G is automatically shifted by the following means:

The plate G is provided with a lateral extension $G^3$, which when the plate is turned into the position shown in Figs. 1 and 2 (so as to hold arm $G^2$ out of engagement with lug $z^3$) assumes and maintains a horizontal position, owing to the weighted arm G'. The under side of extension $G^3$ is provided with a notch $G^4$, which is adapted to engage the upper end of a vibrating lever H, (pivoted at its lower end on a pin H', attached to the frame $z$,) provided with an extension $H^2$, in which is a cam-slot that is traversed by an eccentric-pin $i$ on a worm-gear I, which is journaled on a pin $Z^2$, attached to the extension Z' on the main frame, as shown, so that for each rotation of worm I the lever H is once vibrated back and forth.

The cam slot $h$ in extension H is preferably so shaped as to give a considerable dwell or rest to the lever H at each end of its stroke. The worm-wheel I is operated by a worm J, loosely mounted on shaft A and rigidly connected to the hub of pulley C by means of a web $c$, as shown, so that worm J is rotated continuously with a pulley.

It will be obvious from the foregoing that so long as lever H remains in engagement with the notch $G^4$, and while the pulley is being driven, the plate G, and through its connections the rod F, will be reciprocated so that through the described connections the disks B B' will alternately be engaged with and released from the pulley C. When disk B is engaged with the pulley, the shaft A is rotated and motion may be communicated therefrom by means of a pinion $A^4$, keyed to the shaft, as shown. When disk B' is locked to the pulley, the shaft A is not necessarily rotated, but motion may be communicated from the pulley through disk B' to a compound gear K, journaled on a spindle L, rigidly attached to the frame Z, as indicated in the drawings, and from this compound gear K motion may be transmitted in a contrary direction to the part to be moved, it being obvious that the gears $A^4$ and K will rotate in opposite directions.

From the foregoing description it will be obvious that the operator can disengage plate G from lever H and can by hand shift it and rod F, so as to engage either disk B or B' with the pulley, or can shift the plate so that neither clutch will be engaged, or by dropping the plate to the position shown in Fig. 2 the lever H will enter notch $G^4$ of plate G (the opposite sides of extension $G^3$ being beveled or rounded, as shown, so as to facilitate the engagement of the lever with said notch) and so long as the lever remains in engagement with the notch and the pulley is driven the clutches will be alternately shifted, so as to alternately lock the disks B and B' to the pulley; and thus while the pulley C may be driven continuously in one direction reverse motion may be transmitted through the gears $A^4$ and K.

In the modification shown in Fig. 4 the web of the pulley C is omitted and its hub is utilized as its periphery. Further in this case the pulley is constructed in two opposite halves L L', which inclose the disks M M' and their clutch devices. Part L is connected to the worm J and is thereby journaled upon the shaft, while part L' is journaled upon the hub of the disk M', which substantially corresponds to disk B' in Fig. 1. The clutch-blocks and the connections between the clutch-blocks and the links are slightly different from those shown in Fig. 1, but the remaining essential portions of the apparatus are substantially alike in both Figs. 1 and 4.

In Figs. 6 and 7 another modification of the pulley and clutch devices is illustrated. In this the disk B is omitted. The pulley N is connected to the worm J, as before, but is provided with an annular web N', which carries both sets of clutch-blocks $o\ p$. The clutches $o$ are adapted to engage the flange O' of a disk O, which has a long hub $O^2$, journaled upon the shaft and carrying on its extremity the gear $A^4$. The clutches $p$ are adapted to engage the flange P' of a disk P, the hub $P^2$ of which is journaled upon the hub $O^2$ of the disk O and carries the gear $B^2$, which engages the compound gear K.

The operation and construction of the remaining portion of the apparatus are substantially identical with those shown in Figs. 1 and 4, and further explanation thereof herein is unnecessary.

Having thus described my invention, what I therefore claim as new, and desire to secure by Letters Patent thereon, is—

1. The combination of a pulley, opposite clutch devices adapted to engage therewith; and a worm driven by said pulley, a worm-gear operated by the worm and provided with an eccentric-pin, and a vibrating lever having a cam-slot engaging said pin; with a longitudinally-movable plate reciprocated by the lever, and connections between said reciprocating plate and the clutch devices, substantially as described.

2. The combination of a pulley, opposite clutch devices adapted to engage therewith, a worm driven by said pulley, a worm-gear operated by the worm and a vibrating lever operated by said worm-gear; with a longitudinally-movable and tilting plate having a notch adapted to engage said lever when the plate is thrown in one position, said plate being reciprocated by the lever when engaged therewith, and connections between said reciprocating plate and the clutch devices, for the purpose and substantially as described.

3. The combination of a shaft, a gear on said shaft, the disk on said shaft having a gear on its hub, a pulley loosely journaled on the shaft, the opposite clutch devices therein respectively adapted to alternately lock the pulley to the disk or to the shaft, a worm on said shaft operated by the pulley, a worm-gear operated by said worm, a pivoted lever operated by the worm-gear, and operative connections between said lever and the clutch devices, substantially as described.

4. In a reversing-motion mechanism, the combination of a continuously-driven pulley, the opposite clutches therein adapted to be alternately engaged therewith, and the shaft supporting the pulley and clutches, the worm connected to and rotating with said pulley, and the worm-gear operated by said worm; with a vibrating lever operated by said worm-gear, a plate adapted to be engaged with and operated by said lever, and connections between said plate and the clutch-operating devices, for the purpose and substantially as described.

5. In a reversing-motion mechanism, the combination of a continuously-driven pulley, the opposite clutches therein adapted to be alternately engaged therewith, a tubular shaft supporting the pulley, and clutches, and a reciprocating rod within the shaft, and connecting devices between said shaft and clutches; with a worm connected to and rotating with said pulley, a worm-gear operated by said worm, a vibrating lever operated by said worm-gear, a plate adapted to be engaged with and operated by said lever, and connections between said plate and the clutch-operating rod, substantially as described.

6. The combination of the shaft, the continuously-rotating pulley mounted thereon, the opposite clutch devices on said shaft adapted to be alternately locked to the pulley, and independently-operating gears indirectly connected to and controlled by said clutches; with the longitudinally-movable and tiltable plate, connections between said plate and the clutch-operating devices, a worm-gear operated by said worm and provided with an eccentric-pin, and a vibrating lever adapted to engage said plate, and having a cam-slot engaging said eccentric-pin.

7. The combination of the tubular shaft, the pulley loosely mounted thereon, the opposite sets of clutch devices in said pulley adapted to be alternately engaged therewith, the independently-rotatable gears indirectly connected with said clutch devices, a rod in and projecting from said shaft, a pin transfixing said rod and projecting through slots in said shaft into engagement with the clutch-operating devices in the pulley, an arm rotatably connected to the outer end of said rod, but not longitudinally movable thereon, a tilting and sliding plate mounted above said rod and connected to said arm, said plate being provided with an arm adapted to engage a locking-lug and hold the clutches in intermediate disengaged position, the clutches being brought into operation alternately by shifting the plate longitudinally, substantially as described.

8. The combination of the tubular shaft, the pulley loosely mounted thereon, the opposite sets of clutch devices adapted to be alternately engaged with the pulley, the independently-rotatable gears indirectly connected with said clutch devices, a rod projecting from said shaft, a pin transfixing said rod and projecting through slots in the shaft into engagement with the clutch-operating devices, an arm rotatably connected to the outer end of said rod, but not longitudinally movable thereon, a tilting and sliding plate mounted above said rod and connected to said arm, a worm loosely mounted on said shaft but driven by the pulley, a worm-gear engaging said worm, and provided with an eccentric-pin, a lever operated by said pin, said lever being adapted to engage a notch in said plate and automatically reciprocate the latter, for the purpose and substantially as described.

9. The combination of the tubular shaft, a pinion thereon, a disk loosely mounted thereon, a pinion on the hub of said disk, a pulley loosely mounted on the shaft, opposite sets of clutch devices in said pulley adapted to alternately lock the pulley to the disk and to the shaft, a sliding collar on the shaft for operating said clutch devices, a rod within the tubular shaft, a pin connected to said rod and projecting through slots in said shaft into engagement with the clutch-operating collar, an arm journaled on the outer end of said rod, but not rotatable therewith, and a sliding and tiltable plate connected to said arm and adapted to shift the rod, for the purpose and substantially as described.

10. The combination of the tubular shaft, a pinion and a disk loosely mounted thereon, a pinion on the hub of said disk, a pulley loosely mounted on the shaft, opposite sets of clutch devices in said pulley adapted to alternately lock the pulley to the disk and to the shaft, a sliding collar on the shaft for operating said clutch devices, a rod within the tubular shaft, a pin connected to said rod and projecting through slots in said shaft into engagement with the clutch-operating collar, an arm journaled on the outer end of said rod, but not rotatable therewith, a sliding plate connected to said arm, a worm operated by said pulley, a worm-gear and a vibrating lever operated by said gear adapted to operate said plate, for the purpose and substantially as described.

11. In a reversing mechanism, the combination of a shaft, the opposite disks thereon, one of said disks being keyed to the shaft, the other loose thereon, the pulley inclosing said disks, the opposite sets of clutch devices, respectively connected to the disks and adapted to alternately engage the pulley, and mechanism, substantially as described for operating said clutch devices.

12. In a reversing mechanism the combination of a shaft, the opposite disks thereon, one of said disks being keyed to the shaft, the other loose thereon, a pulley inclosing said disks, opposite sets of clutch devices, respectively connected to the disks and adapted to alternately engage the pulley, a worm on said shaft connected to the pulley and rotating therewith, a worm-gear provided with an eccentric-pin, and a vibrating lever having a cam-slot engaging said pin, and connections between said lever and clutch devices, substantially as described.

13. In a reversing mechanism, the combination of a tubular shaft, the opposite disks thereon, one of said disks being keyed to the shaft, the other loose thereon, the pulley inclosing said disks, the opposite sets of clutch devices, respectively connected to the disks and adapted to alternately engage the pulley, a worm on said shaft connected to the pulley and rotating therewith, a worm-gear provided with an eccentric-pin and a vibrating lever having a cam-slot engaging said pin; with a longitudinally-movable plate operated by said lever, a longitudinally-movable rod within the tubular shaft, a pin connected to the inner end of said rod and projecting through two slots in the shaft and engaging the clutch-operating devices, and an arm loosely journaled on the outer end of said shaft and connected to said plate, all substantially as and for the purpose described.

14. In a reversing mechanism, the combination of a tubular shaft, the opposite disks thereon, one of said disks being keyed to the shaft, the other loose thereon, the pulley inclosing said disks and supported thereby; the opposite sets of clutch devices, respectively connected to the disks and adapted to alternately engage the pulley, a worm on said shaft connected to the pulley and rotating therewith, a worm-gear provided with an eccentric-pin, and a vibrating lever having a cam-slot engaging said pin; with a hinged, but longitudinally-movable, plate adapted to engage said lever and be operated thereby when the plate is turned in one position and having a locking-arm adapted to engage a stop and hold both clutches out of engagement when the plate is turned to its other position, a longitudinally-movable rod within the tubular shaft, a pin connected to the inner end of said rod and projecting through two slots in the shaft and engaging the clutch-operating devices, and an arm loosely journaled on the outer end of said shaft and connected to said plate, all substantially as and for the purpose described.

In testimony that I claim the foregoing as my own I affix my signature in presence of two witnesses.

ROBERT EWING.

In presence of—
 FRANK SHRANDER,
 WILLIAM A. BASTEDO.